United States Patent [19]

Takeya et al.

[11] 3,838,856

[45] Oct. 1, 1974

[54] TARGET DISPLAY USING A FRESNEL LENS TO AMPLIFY SIGNAL FROM LIGHT BEAM GUN

[75] Inventors: Takeo Takeya, Tokyo; Toshihiko Wakaki, Kawasaki, both of Japan

[73] Assignees: Tokyo Shibaura Electric Co., Ltd., Kawasaki-shi; Toshiba Electronic Systems Co., Ltd., Tokyo, both of, Japan

[22] Filed: July 31, 1973

[21] Appl. No.: 384,383

[30] Foreign Application Priority Data

Aug. 3, 1972 Japan ................................ 47-77788

[52] U.S. Cl. .................... 273/101.1, 35/25, 178/7.2, 340/324 A

[51] Int. Cl. ................................................ F41j 4/02

[58] Field of Search ....... 273/DIG. 28, 101.1, 101.2; 35/25; 178/7.2, DIG. 1, 6.8; 340/324 A

[56] References Cited

UNITED STATES PATENTS

| | | | |
|---|---|---|---|
| 2,986,596 | 5/1961 | Hammond | 178/5.6 |
| 3,718,914 | 1/1970 | Muller | 178/6.8 |
| 3,790,704 | 2/1974 | Collomosse | 178/6.8 |
| 3,796,826 | 3/1974 | Kerr | 178/7.2 |
| 3,798,796 | 3/1974 | Stauff | 35/25 |

*Primary Examiner*—Richard C. Pinkham
*Assistant Examiner*—Marvin Siskind
*Attorney, Agent, or Firm*—Flynn & Frishauf

[57] ABSTRACT

A target apparatus is used with a light beam gun, a light beam shot from which hits a transparent target and focused by a Fresnel lens to be applied in a television image pickup tube. The landing position of the light beam on the target is displayed on a television receiving set through the image pickup tube.

6 Claims, 7 Drawing Figures

TARGET DISPLAY USING A FRESNEL LENS TO AMPLIFY SIGNAL FROM LIGHT BEAM GUN

This invention relates to a target apparatus used with a light beam gun which is capable of indicating a light-landing position on a target.

With a light beam gun for shooting a fully concentrated light beam such as a laser beam, a target apparatus is used to indicate a light-landing position of a target. A known typical target apparatus comprises a light-receiving element such as a photo diode or photoconductive cell. When used alone, however, such a light-receiving element can only detect whether or not a light beam discharged by a light gun has landed within a specified range on a target defined by the area of the light-receiving surface of the light-receiving element, but fails to point out the exact spot within the specified range where the light beam has actually landed. Therefore, a target using a single light-receiving element has the drawback that it can not call up a competitve interest in light beam gun users.

To eliminate the above-mentioned difficulties, there has been proposed an electronic target apparatus comprising a large number of light-receiving elements arranged in a plane so as to distinguish which of the elements has received a light beam released by a light beam gun. However, a light beam gun in practical use impresses as small a shot mark as a roughly circle having a diameter of several millimeters. To indicate such a small shot mark unfailingly all over a target, it is necessary to make a light-receiving element substantially small enough to match the shot mark and moreover provide a large number of such compact light-receiving elements, resulting in the complicated construction and expensiveness of a resulting electronic target arrangement.

It is accordingly the object of this invention to provide a relatively inexpensive electronic target apparatus of simple construction which is capable of electronically detecting and indicating the landing position on a target of a shot of light beam discharged by a light beam gun with a high resolving capacity.

The present invention can be more fully understood from the following detailed description when taken in connection with reference to the accompanying drawings, in which:

FIG. 1 schematically illustrates an electronic target apparatus embodying this invention together with a light beam gun;

Figure 7:
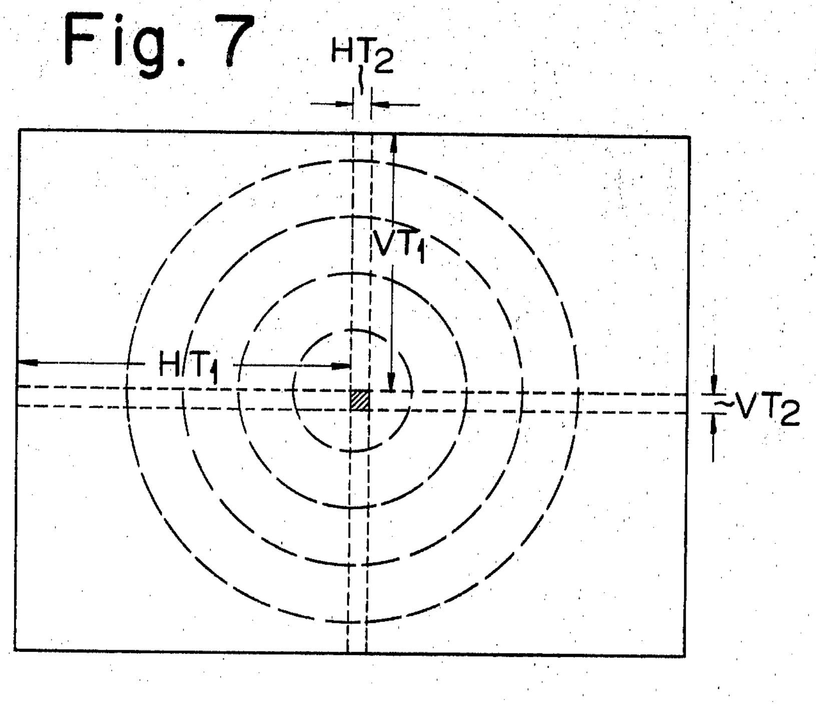
Figure 6:
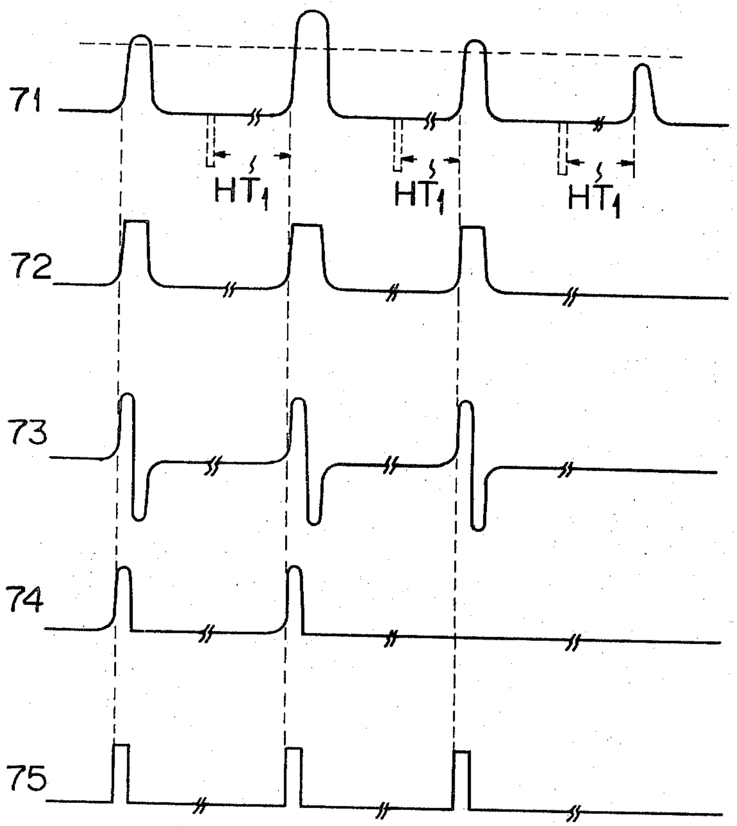
Figure 4:
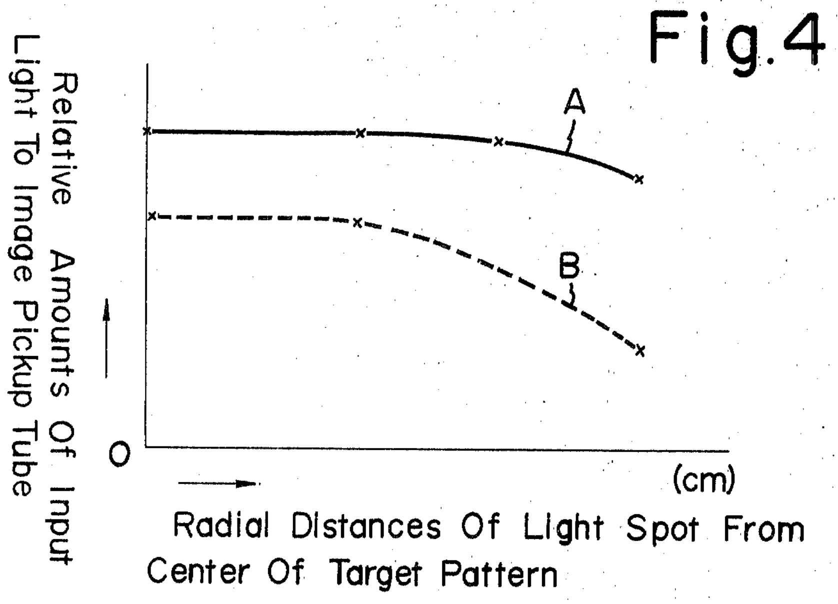
Figure 5:
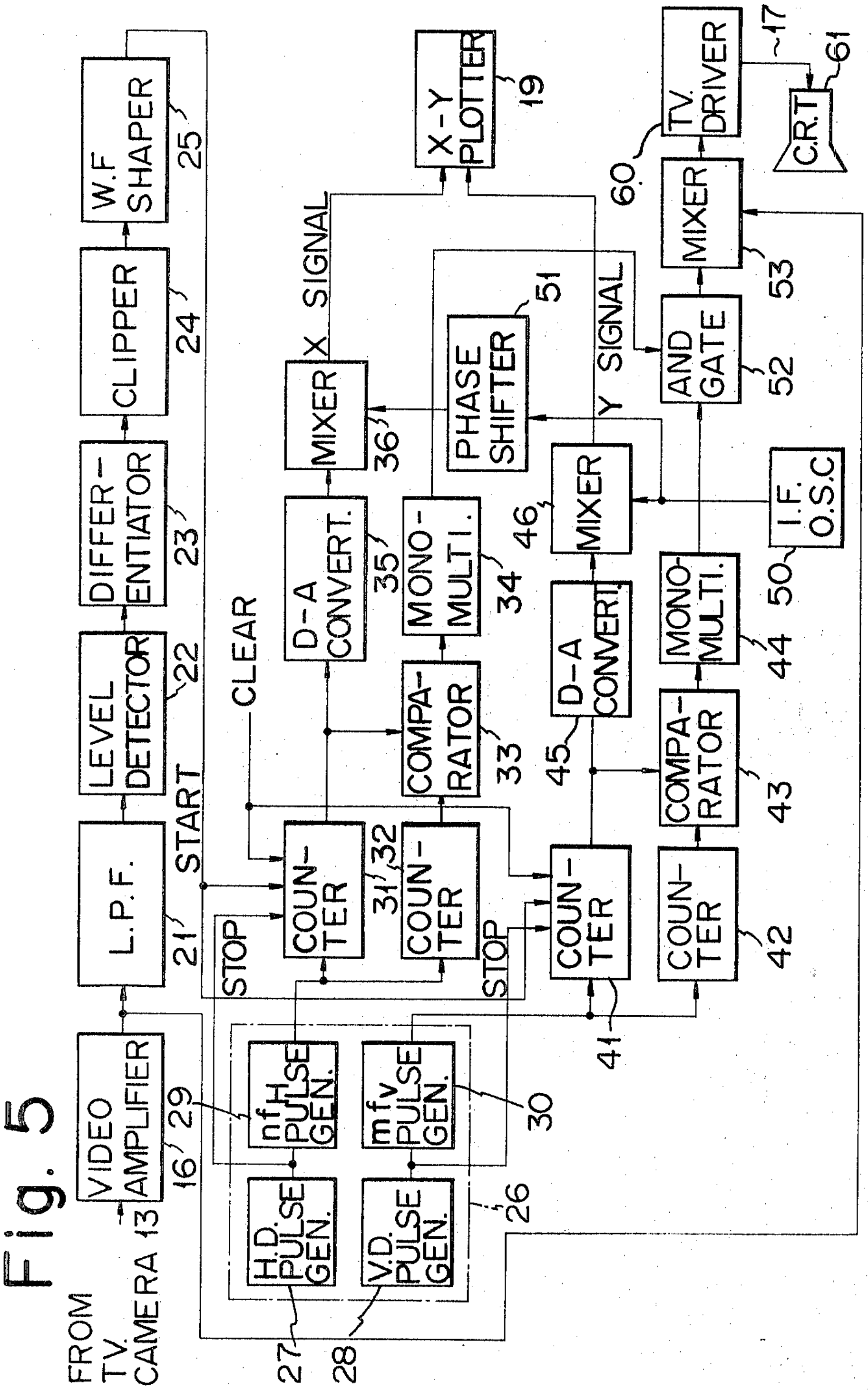

FIG. 4 is a graph comparing the intensity of an input signal to the image pickup tube when the Fresnel lens is used and that of said input signal when the Fresnel lens is not used; and FIGS. 5 to 7 jointly present a modification of an electronic target apparatus for detecting, indicating and recording the landing position of a light beam released by a light beam gun, wherein FIG. 5 is an electric circuit diagram of the same, FIG. 6 shows the wave forms of signals generated in the respective stages of the electric circuit, and FIG. 7 illustrates a target indicating the landing position of a light.

Figure 1:
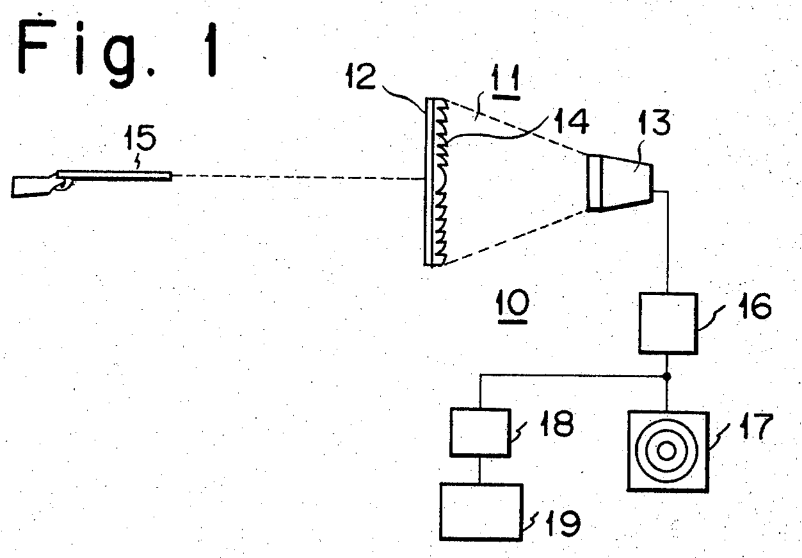
Figure 2:
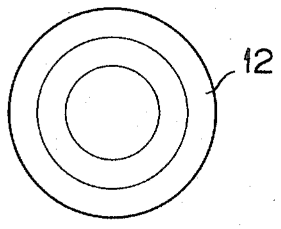
FIG. 2 is a plan view of a target pattern drawn on a transparent screen.

There will now be described by reference to the appended drawings an electronic target apparatus embodying this invention. Referring to FIG. 1, general referential numeral 10 denotes an electronic target apparatus, which comprises a light-landing section or target 11, consisting of a transparent screen 12, for example, a thin sheet made of Miler (Trade Name) and a Fresnel lens 14 fitted to the backside (or forward side) of the transparent screen 12. Behind the Fresnel lens 14 is spatially disposed a conventional television image pickup tube 13 with an optical member (not shown) for focussing the beam, such as E-5030, E-5052 or E-5124 from TOKYO SHIBAURA ELECTRIC CO., LTD. The photoconductive surface of the television image pickup tube 13 should preferably be distanced from the Fresnel lens 14 substantially equal to the focal length of said lens 14. In this embodiment, the distance is chosen to be about 40 cm. On the transparent screen 12 is drawn a target pattern consisting, as shown in FIG. 2, of a plurality of concentrically arranged circles. Ahead of the transparent screen 12 is located a laser beam emitting gun 15. A light beam from said laser gun 15 impresses a spot image on the target pattern of the transparent screen 12. The spot image is focused by the Fresnel lens 14 and conducted into the image pickup tube 13.

The output side of the image pickup tube 13 is electrically connected to a television receiving set 17 through a video amplifier 16, both of the known type. As the result, the target pattern and the bright landing spot of a light beam from the laser gun 15 focused on the photoconductive surface of the image pickup tube 13 are read out by the known electric scanning to constitute input signals to the video amplifier 16, and amplified thereby to be indicated as a visible image on the television receiving set 17. The image pickup tube 13, video amplifier and receiving set 17 jointly constitute the known closed circuit television system. If the receiving set 17 consists of the known storage type cathode ray tube, then it will offer convenience in maintaining a visible image on the screen for a desired length of time.

The output side of the amplifier 16 is further connected to a circuit 18 for detecting a bright light landing spot, the output of said circuit 18 being connected to an X-Y plotter 19. Accordingly, an image signal amplified by the amplifier 16 is also supplied to said detecting circuit 18. This circuit 18 generates signals indicating the position of the light spot in the X and Y directions from a scanning line bearing said light spot an a signal showing the position of said light spot on the scanning line. These position signals actuate the X-Y plotter 19 so as to indicate the light landing spot by plotting.

Figure 3:
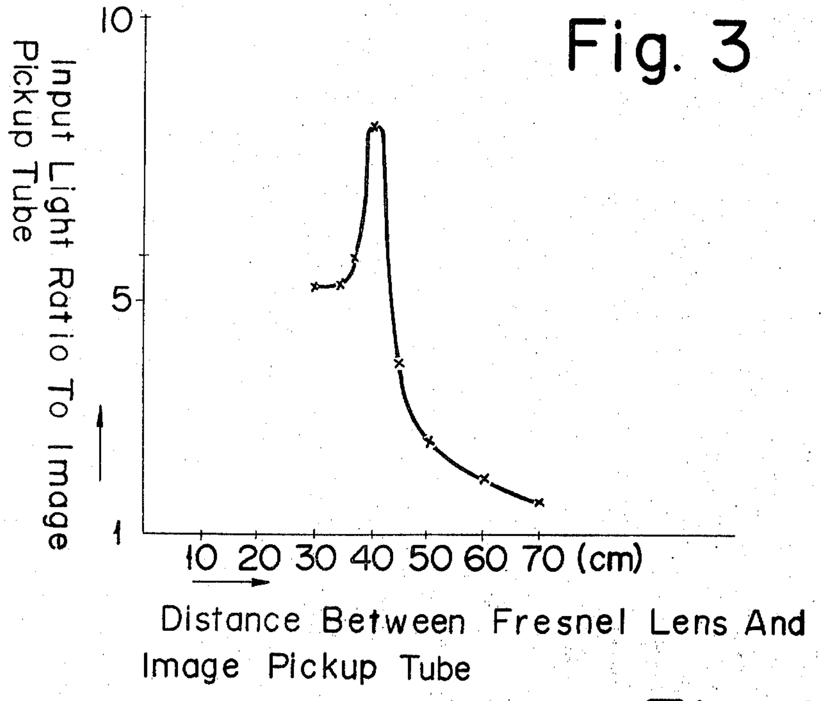
FIG. 3 is a graph showing variations in the intensity of an input signal to an image pickup tube with the distance between a Fresnel lens and the image pickup tube.

The reason why the target apparatus of this invention comprises a Fresnel lens is that it is desired to increase an amount of an input light to the television pickup tube 13. FIG. 3 is a characteristic curve diagram prepared by plotting the distance between the Fresnel lens 14 whose focal length is 40 cm and the photoconductive surface of the image pickup tube 13 on the abscissa and plotting on the ordinate a comparison between an amount of an input light to the image pickup tube 13 when the Fresnel lens is used and that of said input light when the Fresnel lens is not used and finally experimentally determining the relationship of the aforesaid distance and the relative amounts of input light in both cases. As apparent from FIG. 3, while the distance between the Fresnel lens and the image pickup tube is maintained within the range of 30 to 70 cm, a larger amount of light is received when the Fresnel lens is used than when said lens is not used. Particularly when the above-mentioned distance stands at about 40 cm, the amount of input light obtained during the use of the Fresnel lens bears a maximum ratio to the amount of input light received in the absence of said Fresnel lens. The above-mentioned experiment refers to the case where a visible light was projected on a certain point on the transparent screen 12, for example, a point 8.5 cm apart from the center. Where, therefore, the television image pickup tube 13 has only to receive such s small amount of input light as is obtained in the absence of said Fresnel lens, then the laser beam gun 15 may consist of a type ejecting a smaller amount of light, offering the advantage of not only rendereing the gun itself of much simpler construction, but also minimizing the possibility of a harmful effect being exerted on human beings when the laser light is carelessly directed to them. Conversely where the laser gun 15 is designed to shoot a fixed amount of light, and the television image pickup tube 13 has only to receive such small amount of input light as is obtained in the absence of the Fresnel lens 14, then application of said lens allows the laser gun 15 to be more removed from the target by that extent, increasing competitive interest to the gun users.

When the Fresnel lens 14 is spaced from the image pickup tube 13 for a distance corresponding to the focal length, then the image pickup tube 13 is supplied with a more uniform amount of input light than when the Fresnel lens 14 is not applied, regardless of the point on the transparent screen 12 which is hit by a shot of light beam. FIG. 4 shows the results of experiments carried out to prove the above-mentioned fact. Referring to FIG. 4, the relative amounts of input light supplied to the image pickup tube 13 with and without the Fresnel lens 14 are plotted on the ordinate, and the radial distances of light spots from the center of the target pattern are plotted on the abscissa. A solid line A denotes variations in the amount of input light with the radial distances when the Fresnel lens 14 was used and a broken line B represents said variations when the Fresnel lens 14 was not used. As apparent from FIG. 4, application of the Fresnel lens 14 provides a larger amount of input light than in the absence of said lens 14, and minimizes a progress decrease in the amount of input light as light spots are radially more removed from the center of the target pattern. In other words, use of the Fresnel lens 14 reduces changes in the intensity of output signals from the image pickup tube 13 caused by the different positions of light spots on the target pattern.

There will now be described by reference to FIGS. 5 to 7 a modification of the electronic target apparatus of this invention for detecting, indicating and recording light landing positions on a target.

An image of target circles on the tansparent screen 12 which is later focused on the photoconductive layer of the image pickup tube 13 and an image of a light spot formed by a light discharged by the laser beam gun 15 are read by the known electric scanning to form image signals. These image signals are conducted from the image pickup tube to a video amplifier 16 so as to be amplified and then to a low pass filter 21 and mixer 53. The low pass filter 21 eliminates noises overlapping the image signals to provide a signal bearing the wave form 71 shown in FIG. 6.

Light spots are distributed over a plurality of horizontal scanning lines, generating image signals bearing various levels for each scanning line. Image signals corresponding to the light spots generally have a higher level than those denoting the target circles, and can be easily distinguished from the latter. Accordingly, the pulses of the wave form 71 can be taken to represent only the former group of image signals. A level detector 22 derives out a signal having a wave form 72 corresponding to the largest amplitude of the wave form 71. An output signal from the level detector 22 is differentiated by a differentiator 23 into a wave form 73 in the next stage into a wave form 74 by a clipper 24. The pulses of wave form 74 rises near the intermediate point of a signal having a wave form 72 representing the largest amplitude of the wave form 71 constituting the image signal of the light spot. Accordingly, rectangular output pulses 75 having a wave form produced by a wave form shaper 25 correspond to the central point of the light landing position. The output pulses 75 are supplied as start pulses to a subtracting counter 31 for detecting said light landing position in the horizontal direction and also to a subtracting counter 41 for detecting said light landing position in the vertical direction. The subtracting counters 31 and 41 are supplied by a synchronizing pulse generator 26 with pulses having repetition frequencies $nf_H$ and $mf_V$ respectively. The synchronizing pulse genrator 26 which is actuated in synchronization with electric scanning consists of a horizontal driving pulse generator 27, a vertical driving pulse generator 28 and two other pulse genrators 29 and 30, the pulse generators 27, 28 cooperating in the scanning of the image pickup tube.

The pulse generator 29 multiplies $n$-fold the repetition frequency $f_H$ of an output pulse from the horizontal driving pulse generator 27 to generate a pulse having a frequency of $nf_H$. It will be noted that n represents a value determined by the horizontal resolving capacity of the subject target apparatus to detect the light landing position.

The pulse generator 30 multiplies $m$-fold the repetition frequency $f_V$ of an output pulse from the vertical driving pulse generator 28 to generate a pulse having a frequency of $mf_V$. It will be noted that $m$ denotes a value defined by the vertical resolving capacity of the subject target apparatus to detect the light landing position.

The subtracting counter 31 commences subtraction upon receipt of an output pulse from the waveform shaper 25 and stops subtraction upon receipt of an output pulse from the horizontal driving pulse generator 27.

Counters 32 and 42 count pulses having numbers of $nf_H$ and $mf_V$ for each period of the horizontal and vertical scanning respectively and are supplied with output pulses from the pulse generators 29 and 30. When, therefore, a comparator 33 detectd the exact time at which an output pulse from the subtracting counter 31 coincides with that from the counter 32, then the light landing position $HT_1$ in the horizontal direction shown in FIG. 7 can be detected. Similarly, an output from a comparator 43 represents thelight landing position $VT_1$ in the vertical direction shown in FIG. 7.

The counters 29 and 30 maintain data stored therein until they are supplied with a clear signal consisting of a signal denoting the commencing time of shooting which is delivered from, for example, the laser gun 15. Outputs from the comparators 33 and 43 are converted into pulses having widths of $HT_2$ and $VT_2$ respectively by monostable multivibrators 34 and 44. Where, therefore, signals obtained by logically operating the last mentioned pulses by an AND gate 52 and signals derived from the video amplifier 16 are combined by a mixer 53, and the resulting composite signal is supplied to the cathode ray tube after being amplified by a TV display driver 60, then it is possible to display, as shown in FIG. 7, both target pattern and light landing position at the same time.

Output signals from the subtracting counters 31 and 41 are converted into analog singals by D-A converters 35 and 45 and supplied to mixers 36 and 46. The mixers 36 and 46 are supplied withs ignals of several cycles by a low frequency oscillator 50. An output signal from the mixer 36 represents the X axis and an output signal from the mixer 46 denotes the Y axis. An output signal from the oscillator 50 is supplied to the mixer 36 after being shifted about 90 2 radian by a phase shifter 51. Thus, the X-Y plotter 19 which is supplied with signals representing the X and Y axes can draw a light landing position with a circle having the prescribed size (Lissajous figure).

What we claim is:

1. A target apparatus used with a light beam gun discharging a light beam comprising, target means capable of passing a beam of light; a Fresnel lens placed rearwardly of the target for focusing the light beam; a television image pickup tube having a light receiving surface placed for receiving and sensing the focused light beam and generating an image signal corresponding to a light beam landing position on said target means; and a display means operatively coupled to the pickup tube for indicating the light landing position on the target means upon receipt of the image signal.

2. A target apparatus according to claim 1 wherein the target means includes a transparent screen impressed with a target pattern and disposed to face the Fresnel lens.

3. A target apparatus according to claim 2 wherein the Fresnel lens is positioned on that side of the transparent screen which faces the television image pickup tube; a light discharged by the light beam gun directly impinges on the transparent screen and, after penetrating the screen, is focused by the Fresnel lens.

4. A target apparatus according to claim 3 wherein the Fresnel lens is spaced from the light-receiving surface of the television image pickup tube for a distance sustantially equal to the focal length of the Fresnel lens.

5. A target appparatus according to claim 2 wherein the display means comprises a cathode ray tube and an electric circuit for generating a signal showing the light landing position upon receipt of an output signal from the television image pickup tube and deriving said signal representing the light landing position to the cathode ray tube, thereby causing the light landing position on the target to be displayed on the cathode ray tube.

6. A target apparatus according to claim 2 wherein the display means comprises an X-Y plotter and an electric circuit for generating a signal indicating a light landing position upon receipt of an image signal from the television image pickup tube and supplying the X-Y plotter with said signal denoting the light landing position, thereby enabling the light landing position on the target to be recorded by the X-Y plotter.

* * * * *